United States Patent
Nakazato et al.

(10) Patent No.: US 7,900,741 B2
(45) Date of Patent: Mar. 8, 2011

(54) TORQUE TUBE

(75) Inventors: Takahiro Nakazato, Nissin (JP);
Tomoyuki Kano, Toyota (JP)

(73) Assignee: Toyota Jidosha Kabushiki Kaisha,
Toyota (JP)

( * ) Notice: Subject to any disclaimer, the term of this patent is extended or adjusted under 35 U.S.C. 154(b) by 133 days.

(21) Appl. No.: 12/230,009

(22) Filed: Aug. 21, 2008

(65) Prior Publication Data

US 2009/0065284 A1    Mar. 12, 2009

(30) Foreign Application Priority Data

Sep. 11, 2007    (JP) ................................. 2007-236030

(51) Int. Cl.
*B60K 17/24*    (2006.01)
*F16H 57/02*    (2006.01)
*B23K 28/02*    (2006.01)
*B60B 35/16*    (2006.01)

(52) U.S. Cl. ..... 180/380; 29/525.14; 74/607; 228/173.4; 301/137

(58) Field of Classification Search ................. 29/525.1, 29/525.14; 74/607; 180/337, 344, 375, 377, 180/378, 379, 380, 383; 219/59.1, 60 R, 219/60.2, 61, 67; 228/131, 173.4; 285/288.1; 301/131, 137
See application file for complete search history.

(56) References Cited

U.S. PATENT DOCUMENTS

| D25,591 | S | * | 6/1896 | Guy ............................. D12/117 |
| 1,450,935 | A | * | 4/1923 | Anderson ..................... 403/270 |
| 3,998,290 | A | * | 12/1976 | Sivers et al. ................. 180/380 |
| 4,273,207 | A | * | 6/1981 | Sivers et al. ................. 180/380 |
| 4,356,376 | A | * | 10/1982 | Komanduri et al. ..... 219/121.72 |
| 4,479,662 | A | * | 10/1984 | Defour et al. .............. 280/281.1 |
| 5,067,582 | A | * | 11/1991 | Muller et al. ................. 180/380 |
| 5,267,623 | A | * | 12/1993 | Kashiwagi ..................... 180/58 |
| 5,324,073 | A | * | 6/1994 | Alatalo et al. ......... 280/124.116 |
| 5,848,853 | A | * | 12/1998 | Clenet .......................... 403/272 |
| 2006/0157955 | A1 | * | 7/2006 | Kurokawa et al. ............ 280/279 |

FOREIGN PATENT DOCUMENTS

| EP | 277891 A1 * | 8/1988 |
| JP | U-5-27223 | 4/1993 |
| JP | A-2005-313184 | 11/2005 |
| JP | A-2006-143130 | 6/2006 |

* cited by examiner

*Primary Examiner* — Paul N Dickson
*Assistant Examiner* — Joseph Rocca
(74) *Attorney, Agent, or Firm* — Oliff & Berridge, PLC

(57) ABSTRACT

The other end of a hub portion is located farther from an attachment portion at a lateral portion, which is located in a lateral direction with respect to the vehicle, than at a vertical portion, which is located in a vertical direction with respect to the vehicle. The vertical portion of the hub portion has a concave end face on the side of the other end of the hub portion, which is formed to get closer to the attachment portion as the concave end face approaches a portion closest to the attachment portion substantially at the center of the hub portion in the lateral direction.

8 Claims, 3 Drawing Sheets

TORQUE TUBE

INCORPORATION BY REFERENCE

The disclosure of Japanese Patent Application No. 2007-236030 filed on Sep. 11, 2007 including the specification, drawings and abstract is incorporated herein by reference in its entirety.

BACKGROUND OF THE INVENTION

1. Field of the Invention

The invention relates to a torque tube connecting a power transmission unit, to which drive force is input via a power transmission shaft forming a portion of a power transmission path of a vehicle, to a non-rotational member.

2. Description of the Related Art

Japanese Patent Application Publication No. 2006-143130 (JP-A-2006-143130) describes a toque tube used in a vehicle in which drive force is input to a power transmission unit via a power transmission shaft forming a portion of the power transmission path of the vehicle. The torque tube covers the outer face of the power transmission shaft and thus connects the power transmission unit to a non-rotational member.

The torque tube receives drive force, brake force, and reactive torque and thereby suppresses the vibration at the drive line of the vehicle (drive shafts, propeller shaft). Further, the use of the torque tube eliminates the need of providing the upper control arms and thus enables lowering the vehicle floor.

One type of such torque tubes may have (a) a flange member having a cylindrical hub portion and an attachment portion protruding radially outward from one end of the hub portion and attached to the power transmission unit; and (b) a tubular member one end of which is fit in the other end of the hub portion and welded along the end face of the one end of the hub portion and the other end of which is secured to the non-rotational member.

Meanwhile, in a state where drive force, brake force, or reactive torque is produced, that is, when the vehicle is accelerated or decelerated, the produced force or torque causes bending movement on the torque tube, and this bending moment acts substantially in the vertical direction of the vehicle. Typically, the tubular portion has a generally circular cross section and the end face of the other end of the hub portion is substantially parallel to a plane perpendicular to the longitudinal direction of the tubular portion, and the hub portion is welded along said end portion, that is, along a generally circular weld line over the entire circumference. Therefore, the stress acting on the torque tube due to the aforementioned bending moment undesirably tends to undesirably concentrate at the welded portions, at which the shape sharply changes, on a plane that extends through and parallel to the drive force transmission shaft vertically with respect to the vehicle.

SUMMARY OF THE INVENTION

The invention provides a torque tube for a vehicle, which suppresses stress concentration due to bending moment that is caused when the vehicle is running.

In view of the above situation, the inventors have conducted various studies and investigations and found the following. That is, if the shape of the other end of the hub portion of the torque tube is modified such that welded points are shifted on a plane that extends through and parallel to the power transmission shaft vertically with respect to the vehicle, the stress concentration to the welded portions can be effectively suppressed. As well as such stress concentration suppression, the shape modification provides a longer weld length which increases the welding strength. The invention has been made based on these findings.

An aspect of the invention relates to a torque tube for a vehicle having (a) a power transmission shaft forming a portion of a power transmission path and a power transmission unit to which drive force is input via the power transmission shaft, the torque tube covering an outer face of the power transmission shaft and connecting the power transmission unit to a non-rotational member. The torque tube has: (b) a flange member having a cylindrical hub portion and an attachment portion protruding radially outward from one end of the hub portion and attached to the power transmission unit; and (c) a tubular member one end of which is fit in the other end of the hub portion and welded along an end face of the other end of the hub portion, and the other end of which is secured to the non-rotational member, wherein (d) the other end of the hub portion is located farther from the attachment portion at a lateral portion of the hub portion, which is located in a lateral direction with respect to the vehicle, than at a vertical portion of the hub portion, which is located in a vertical direction with respect to the vehicle.

The above-described torque tube may be such that (e) the vertical portion of the hub portion has a concave end face on the side of the other end of the hub portion, wherein the concave end face is formed to get closer to the attachment portion as the concave end face approaches a portion closest to the attachment portion substantially at the center of the hub portion in the lateral direction.

Further, the above-described torque tube may be such that (f) the portion of the concave end face closest to the attachment portion extends in an arc having a predetermined curvature radius.

Further, the above-described torque tube may be such that (g) the portion of the concave end face closest to the attachment portion extends straight in parallel to the attachment portion.

Further, the above-described torque tube may be such that (h) the power transmission shaft is a propeller shaft, (i) the power transmission unit is a differential gear unit that distributes toque input via the propeller shaft to left and right drive wheels, and (j) the attachment portion of the flange member is attached to a case of the differential gear unit.

Further, the above-described torque tube may be such that (k) the other end of the tubular portion is directly, or indirectly, connected to a body of the vehicle.

According to the torque tube described above, the torque tube has: (b) the flange member having the cylindrical hub portion and the attachment portion protruding radially outward from the one end of the hub portion and attached to the power transmission unit; and (c) the tubular member one end of which is fit in the other end of the hub portion and welded along the end face of the other end of the hub portion, and the other end of which is secured to the non-rotational member, and (d) the other end of the hub portion is located farther from the attachment portion at a lateral portion of the hub portion, which is located in a lateral direction with respect to the vehicle, than at a vertical portion of the hub portion, which is located in a vertical direction with respect to the vehicle. This structure suppresses stress concentration to a specific portion or portions of the torque tube which may be caused by the bending moment applied when the vehicle is running. Further, the extended weld length provides a higher welding strength.

According to the above-described torque tube, further, (e) the vertical portion of the hub portion has the concave end face on the side of the other end of the hub portion, wherein the concave end face is formed to get closer to the attachment portion as the concave end face approaches a portion closest to the attachment portion substantially at the lateral center of the hub portion. This structure further suppresses stress concentration to a specific portion or portions of the torque tube which may be caused by the bending moment applied when the vehicle is running. Further, the extended weld length provides a higher welding strength.

According to the above-described torque tube, further, (f) the portion of the concave end face closest to the attachment portion extends in an arc having a predetermined curvature radius. This structure further suppresses stress concentration as compared to when said portion of the concave end face sharply changes its shape.

According to the above-described torque tube, further, (g) the portion of the concave end face closest to the attachment portion extends straight in parallel to the attachment portion. This structure further suppresses stress concentration and increases the welding strength at the lateral center of the toque tube.

According to the above-described torque tube, further, (h) the power transmission shaft is a propeller shaft, (i) the power transmission unit is a differential gear unit that distributes toque input via the propeller shaft to left and right drive wheels, and (j) the attachment portion of the flange member is attached to a case of the differential gear unit. This structure suppresses stress concentration to a specific portion or portions of the torque tube that may be caused due to the bending moment that occurs at the power transmission path including the propeller shaft and the differential gear unit when the vehicle is running. Further, the extended weld length increases the welding strength of the torque tube.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Hereinafter, example embodiments of the invention will be described in detail with reference to the drawings. It is to be understood that the structures shown in the respective drawings are simplified or modified for the sake of simplicity and therefore the structural dimensions shown in each drawing are not accurate.

Figure 1:
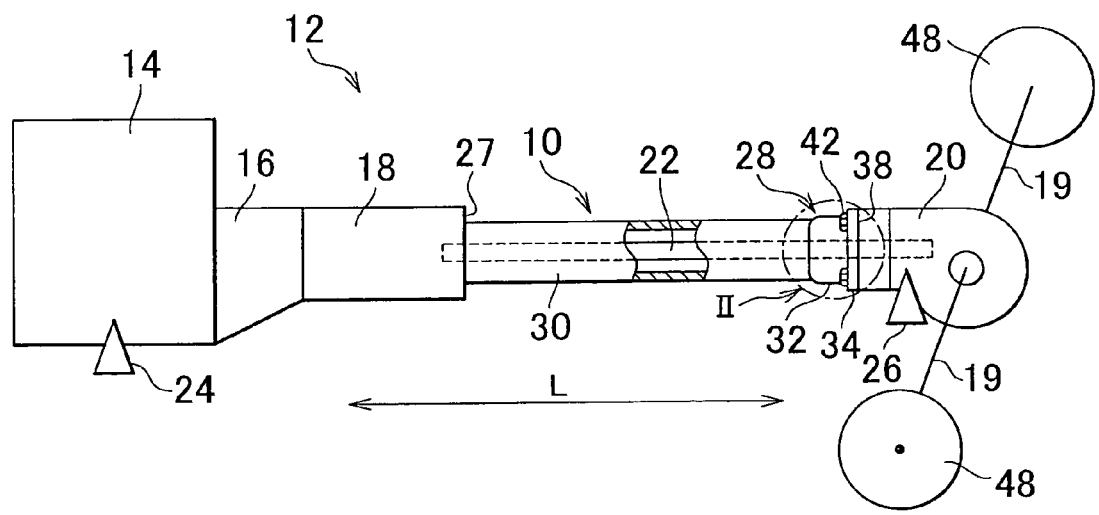
FIG. 1 is a view showing an engine and a drive train ("power transmission path") incorporating a torque tube according to an example embodiment of the invention.

FIG. 1 shows a drive train ("power transmission path") 12 incorporating a torque tube ("torque tube") 12 according to an example embodiment of the invention and an engine 14. The engine 14 is mounted at the front side of the vehicle. The drive train 12 has a clutch unit 16 provided on the rear side of the engine 14, a transmission 18 provided on the rear side of the clutch unit 16, a torque tube 10 provided on the rear side of the transmission 18, and a differential gear unit ("power transmission unit") 20 provided on the rear side of the torque tube 10 and on drive shafts 19. A propeller shaft ("power transmission shaft") 22 is rotatably supported in the torque tube 10. One end of the propeller shaft 22 is connected to the output shaft, not shown in the drawings, of the transmission 18, while the other end is connected to a pinion meshed with a large-diameter ring gear, not shown in the drawings, of the differential gear unit 20.

The block of the engine 14, the case of the clutch unit 16, the case of the transmission 18, the torque tube 10, and the case of the differential gear unit 20 are integrated by being coupled with each other. The engine 14 is mounted on the vehicle body, not shown in the drawings, via a front mount 24, and the differential gear unit 20 is mounted on the vehicle body via a rear mount 26. The differential gear unit ("power transmission unit") 20 is connected to the case 27 of the transmission 18, which is a non-rotational member, via the torque tube 10 that covers the outer face of the propeller shaft 22. The torque tube 10 has a flange member 28 and a tubular portion 30.

Figure 2:
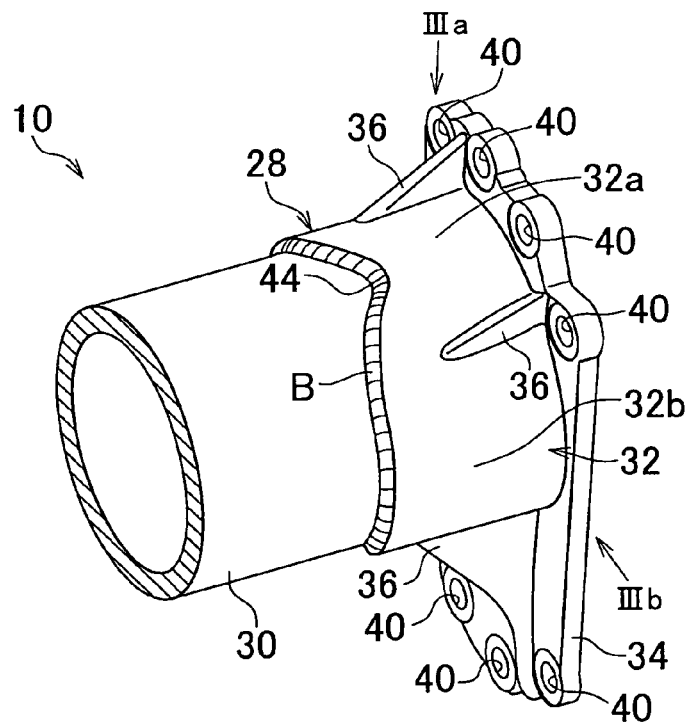
FIG. 2 is a perspective view showing one end of the torque tube secured to a differential gear unit ("power transmission unit"), which is indicated by the arrow II in FIG. 1.
Figure 3A:
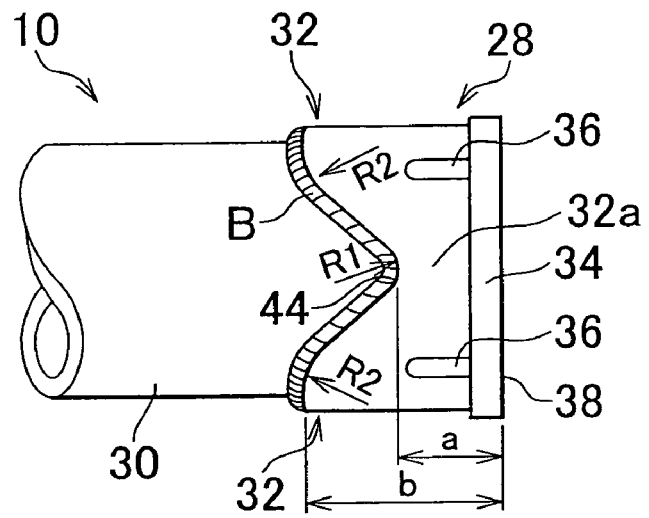
FIG. 3A is a top view of the torque tube shown in FIG. 2
Figure 3B:
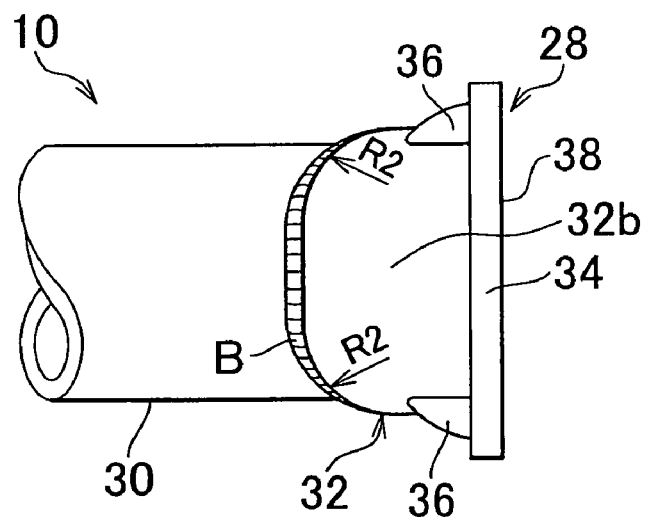
FIG. 3B is a side view of the same torque tube.

FIG. 2 is a perspective view showing the differential gear unit 20 side end portion of the torque tube 10 to which the differential gear unit 20 is connected (the end portion indicated by the arrow II in FIG. 1). FIG. 3A is a top view of the end portion of the torque tube 10 shown in FIG. 2 as viewed in the direction indicated by the arrow IIIa. FIG. 3B is a side view of the same end portion of the torque tube 10 as viewed in the direction indicated by the arrow IIIb. The flange member 28 has a hub portion 32 provided radially inward of the flange member 28 and having a short cylindrical shape, an attachment portion 34 protruding radially outward from the end of the hub portion 32 on the side adjacent to the differential gear unit 20, and attached to the differential gear unit 20, and a plurality of reinforcing ribs 36 provided at the boundary between the hub portion 32 and the attachment portion 34. The reinforcing ribs are circumferentially spaced from each other at given intervals. The flange member 28 is formed as a single part by casting, for example. The attachment portion 34 has, on the differential gear unit 20 side, an attachment face 38 that is substantially parallel to a plane perpendicular to the longitudinal direction of the torque tube 10, that is, the longitudinal direction of the propeller shaft 22 (the direction indicated by "L" in FIG. 1). Attachment holes 40 are provided at the outer periphery of the attachment portion 34. Each attachment hole 40 extends in the direction L. The torque tube 10 and the differential gear unit 20 are secured to each other by bolts 42 tightened to the attachment holes 40. The reinforcing ribs 36 extend substantially in the vertical direction of the vehicle to resist bending moment acting in the vertical direction of the vehicle.

The other end the hub portion 32 is located farther from the attachment portion 34 away from the differential gear unit 20 at side portions 32b, which are located in a lateral direction with respect to the vehicle, than at upper and lower portions 32a, which are located in a vertical direction with respect to the vehicle. That is, referring to FIG. 3, the length b of the side portions 32b is longer than the length a of the upper and lower portions 32a. More specifically, the end faces at the ends of the upper and lower portions 32a away from the differential gear unit 20, which will be referred to as "distal ends" if necessary, each include a concave face 44 that gets closer to the attachment portion 34 as the concave face 44 approaches the portion closest to the attachment portion 34 at the lateral center of the hub portion 32. As viewed in the radial direction of the hub portion 32, the portion of the concave face 44 closest to the attachment portion 34 extends in an arc having a curvature radius R1 about a curvature center located on the vehicle front side of the concave face 44, and the end faces of the portions located across the upper and lower portions 32*a* and the side portions 32*b* each extend in an arc having a curvature radius R2 about a curvature center located on the vehicle rear side of the concave face 44. The respective faces are connected into a continuously smooth face.

One end of the tubular portion 30 is fit in the distal end of the hub portion 32 and welded along the end face of the distal end of the hub portion 32. Weld beads B shown in FIG. 2 and FIG. 3 represent the metals that are continuously bonded to each other as a result of the aforementioned welding. The distal end of the tubular portion 30 is secured to the case (non-rotational member) 27 of the transmission 18 and thus connected to the vehicle body, not shown in the drawings, via the clutch unit 16, the engine 14, and the front mount 24.

As the vehicle is driven, the drive force of the engine 14 is input to the propeller shaft ("power transmission shaft") 22 via the clutch unit 16 and the transmission 18 and then it is input from the propeller shaft 22 to the differential gear unit ("power transmission unit") 20. The differential gear unit 20 distributes the power (torque) input from the propeller shaft 22 to left and right drive wheels 48 via the respective drive shafts 19. At this time, the torque tube 10 suppresses the vibration at the drive line (the drive shafts 19 and the propeller shaft 22) by receiving drive force and reactive torque when the vehicle is driven and by receiving brake force when the vehicle is braked.

In a state where such drive force, brake force, or reactive torque is produced, especially when the vehicle is accelerated or decelerated, bending moment acts on the torque tube 10 in the vertical direction of the vehicle. The direction of the bending moment is substantially constant, and therefore stress concentrates at the portions of the torque tube 10 located in the vertical direction of the vehicle. Such stress concentration occurs especially at the aforementioned welded portions at which the shape sharply changes. However, because the welding points between the upper and lower portions 32*a* and the torque tube 10 are shifted in the longitudinal direction L of the torque tube 10, stress dispersedly acts on around the welded portions of the upper and lower portions 32*a*, rather than concentrating at a specific portion or portions.

As described above, the torque tube ("torque tube") 10 of the example embodiment has (b) the flange member 28 having the cylindrical hub portion 32 and the attachment portion 34 protruding radially outward from the proximal end of the hub portion 32 and attached to the differential gear unit ("power transmission unit") 20, and (c) the tubular portion 30 one end of which is fit in the distal end of the hub portion 32 and welded along the end face of the distal end of the hub portion 32, and the other end of which is secured to the case (non-rotational member) 27 of the transmission 18, and further (d) the length of the hub portion 32 from the attachment portion 34 is longer at the side portions 32*b* than at the upper and lower portions 32*a*. This structure suppresses stress concentration to a specific portion or portions of the torque tube 10 which may be caused by the bending moment applied as the vehicle is driven. According to the structure described above, further, the weld length is longer than it is when the length of the hub portion 32 from the attachment portion 34 is uniform, and therefore the welding strength is relatively high.

According to the torque tube 10 of the example embodiment, further, the end faces of the upper and lower portions 32*a* on the side of the distal end of the hub portion 32 each include the concave face 44 that is formed to get closer to the attachment portion 34 as the concave face 44 approaches the portion closest to the attachment portion 34 at the center of the lateral direction of the hub portion 32, and this structure suppresses stress concentration to a specific portion or portions of the torque tube 10 which may be caused by the bending moment applied as the vehicle is driven. Further, the extended weld length provides a higher welding strength.

According to the torque tube 10 of the example embodiment, further, (f) the portion of the concave face 44 closest to the attachment portion 34 extends in an arc having the curvature radius R1, and this structure further suppresses the stress concentration as compared to a case where said portion of the concave face 44 sharply changes its shape.

According to the torque tube 10 of the example embodiment, further, (h) the power transmission shaft is the propeller shaft 22, (i) the power transmission unit is the differential gear unit 20 that distributes the torque input via the propeller shaft 22 to the right and left drive wheels 48, and (j) the attachment portion 34 of the flange member 28 is attached to the case of the differential gear unit 20. This structure effectively suppresses stress concentration to a specific portion or portions of the torque tube 10 which may be caused by the bending moment that occurs at the drive train (power transmission path) 12 including the propeller shaft 22 and the differential gear unit 20 as the vehicle is driven. Further, the extended weld length provides a higher welding strength.

Second Example Embodiment

Next, another example embodiment of the invention will be described. In the following, structural elements identical to those of the foregoing example embodiment are denoted by the same reference numerals and they are not described again.

Figure 4A:
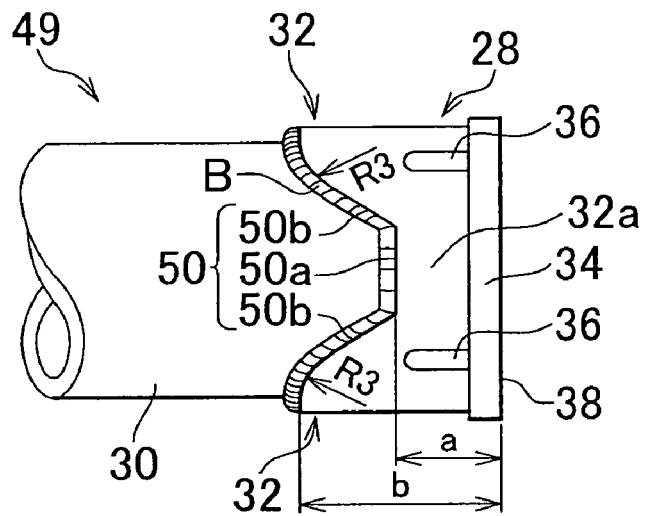
FIG. 4A is a top view of a toque tube according to another example embodiment of the invention and FIG. 4B is a side view of the same torque tube.
Figure 4B:
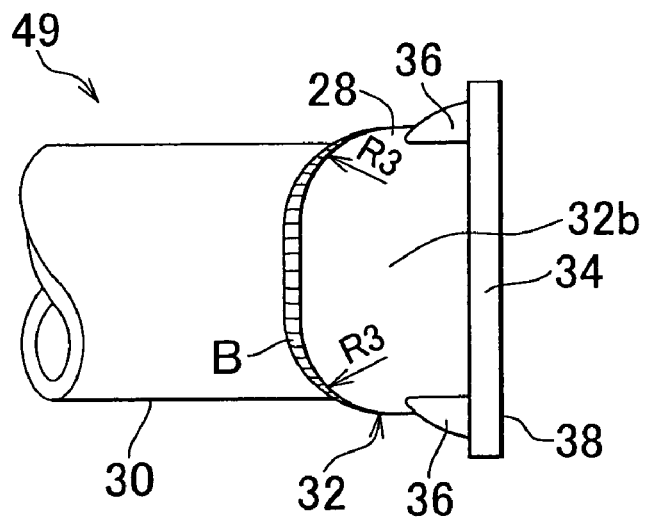

FIG. 4A is a top view of a torque tube 49 of this example embodiment as viewed in the vertical direction of the vehicle. FIG. 4B is a side view of the torque tube 49 as viewed in the lateral direction of the vehicle. The length b that the side portions 32*b* of the hub portion 32 protrude from the attachment portion 34 is longer than the length a that the upper and lower portions 32*a* of the hub portion 32 protrude from the attachment portion 34. More specifically, the end faces at the ends of the upper and lower portions 32*a* away from the differential gear unit 20 each include a concave face 50 that is formed to get closer to the attachment portion 34 as the concave portion 50 approaches the portion closest to the attachment portion 34 at the lateral center of the hub portion 32. As viewed in the radial direction of the hub portion 32, the concave face 50 consists of a straight portion 50*a* parallel to the attachment portion 34 and proximal to the attachment portion 34 and a pair of slanted portions 50*b* provided on the both sides of the straight portion 50*a*, which together form the concave shape of the concave face 50, and the end faces of the portions located across the upper and lower portions 32*a* and the side portions 32*b* each extend in an arc having a curvature radius R3 about a curvature center located on the vehicle rear side of the concave face 50.

According to the torque tube 49 of this example embodiment, because (g) the portion of the concave face 50 closest to the attachment portion 34 is formed by the straight portion 50*a* parallel to the attachment portion 34, stress concentration can be suppressed and the welding strength at the lateral center portion of the torque tube 49 can be increased.

While the invention has been described with reference to the example embodiments thereof, it is to be understood that the invention is not limited to these example embodiments, but the invention may be embodied in various other forms and structures.

For example, while the distal end of the tubular portion 30 is secured to the case (non-rotational member) 27 of the transmission 18 and thus indirectly connected to the vehicle body, not shown in the drawings, via the clutch unit 16, the engine 14, and the front mount 24 in the foregoing example embodiment, the distal end of the tubular portion 30 may be directly attached to the vehicle body or attached to a mount attached on the vehicle body. That is, secured to a non-rotational member, the torque tube properly functions to receive drive force, brake force, and reactive torque and thereby suppresses the vibration at the drive line (the drive shafts 19 and the propeller shaft 22), and further the use of the torque tube eliminates the need of providing the upper control arms and thus enables lowering the vehicle floor.

Further, the reinforcing ribs 36 provided between the hub portion 32 and the attachment portion 34 of the flange member 28 are not necessarily provided.

Further, the concave face 44 of the flange member 28 may be formed by casting or by free-cutting after casting.

Further, while the weld beads B are continuously provided by welding in the foregoing example embodiments, they may alternatively be intermittently provided.

While the invention has been described with reference to the example embodiment thereof, it is to be understood that the invention is not limited to the example embodiment and construction. To the contrary, the invention is intended to cover various modifications and equivalent arrangements. In addition, while the various elements of the example embodiment are shown in various combinations and configurations, which are exemplary, other combinations and configurations, including more, less or only a single element, are also within the sprit and scope of the invention.

What is claimed is:

1. A torque tube for a vehicle having a power transmission shaft forming a portion of a power transmission path and a power transmission unit to which drive force is input via the power transmission shaft, the torque tube covering an outer face of the power transmission shaft and connecting the power transmission unit to a non-rotational member, the torque tube comprising:

a flange member having a cylindrical hub portion and an attachment portion protruding radially outward from a first end of the hub portion and attached to the power transmission unit; and a tubular member, one end of the tubular member is fit in a second end of the hub portion and welded along an end face of the second end of the hub portion, and another end of the tubular member is secured to the non-rotational member, wherein the second end of the hub portion is located farther from the attachment portion at a lateral portion of the hub portion, which is located in a lateral direction with respect to the vehicle, than at a vertical portion of the hub portion, which is located in a vertical direction with respect to the vehicle, and wherein the torque tube axially extends in a longitudinal direction of the vehicle.

2. The torque tube according to claim 1, wherein the vertical portion of the hub portion has a concave end face on a side of the second end of the hub portion, which approaches the attachment portion as the concave end face approaches a portion closest to the attachment portion substantially at a lateral center of the hub portion.

3. The torque tube according to claim 2, wherein the portion of the concave end face closest to the attachment portion extends in an arc having a predetermined curvature radius.

4. The torque tube according to claim 3, wherein the predetermined curvature radius of the arc of the concave end face closest to the attachment portion originates about a curvature center located forward of the end face, and a predetermined curvature radius of an arc of the concave end face farthest from the attachment portion originates about a curvature center located rearward for he end face.

5. The torque tube according to claim 2, wherein the portion of the concave end face closest to the attachment portion extends substantially parallel to the attachment portion.

6. The torque tube according to claim 1, wherein the power transmission shaft is a propeller shaft, the power transmission unit is a differential gear unit that distributes torque input via the propeller shaft to left and right drive wheels, and the attachment portion of the flange member is attached to a case of the differential gear unit.

7. The torque tube according to claim 1, wherein the other end of the tubular member is directly, or indirectly, connected to a body of the vehicle.

8. The torque tube according to claim 1, wherein welding points between the vertical portion of the hub portion and the tubular member are shifted in a longitudinal direction of the torque tube.

* * * * *